(12) United States Patent
Hyakutake et al.

(10) Patent No.: US 8,059,291 B2
(45) Date of Patent: Nov. 15, 2011

(54) SYSTEM, COMPUTER PROGRAM PRODUCT AND METHOD FOR MANAGING DOCUMENTS

(75) Inventors: Shogo Hyakutake, Boonton Township, NJ (US); Hiroaki Ishizuka, San Jose, CA (US); Minoru Aoshima, Edgewater, NJ (US); Akio Kizawa, Ridgewood, NJ (US); Hiroshi Kitada, Tuckahoe, NY (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 1250 days.

(21) Appl. No.: 11/675,779

(22) Filed: Feb. 16, 2007

(65) Prior Publication Data
US 2007/0150534 A1  Jun. 28, 2007

Related U.S. Application Data

(62) Division of application No. 09/795,438, filed on Mar. 1, 2001.

(51) Int. Cl.
*G06F 15/00* (2006.01)
*G06F 15/173* (2006.01)

(52) U.S. Cl. ...................... 358/1.15; 709/224

(58) Field of Classification Search ............... 358/1.15, 358/1.13, 1.14, 1.2, 1.7, 514, 442, 446, 1.12, 358/444, 1.16, 1.18, 402; 709/206, 224, 709/217, 201; 715/775, 838, 769; 399/381, 399/401, 405
See application file for complete search history.

(56) References Cited

U.S. PATENT DOCUMENTS

| | | | |
|---|---|---|---|
| 5,323,393 A | 6/1994 | Barrett et al. | |
| 5,428,782 A | 6/1995 | White | |
| 5,666,490 A | 9/1997 | Gillings et al. | |
| 5,694,601 A | 12/1997 | White | |
| 5,793,964 A | 8/1998 | Rogers et al. | |
| 5,862,404 A | 1/1999 | Onaga | |
| 5,911,044 A | 6/1999 | Lo et al. | |
| 5,928,335 A | 7/1999 | Morita | |
| 5,978,477 A | 11/1999 | Hull et al. | 358/403 |
| 5,999,968 A | 12/1999 | Tsuda | |

(Continued)

FOREIGN PATENT DOCUMENTS
EP  0745929 A1  12/1996
(Continued)

OTHER PUBLICATIONS

U.S. Appl. No. 11/612,929, filed Dec. 19, 2006, Hyakutake, et al.

(Continued)

*Primary Examiner* — Saeid Ebrahimi Dehkordy
(74) *Attorney, Agent, or Firm* — Oblon, Spivak, McClelland, Maier & Neustadt, L.L.P.

(57) ABSTRACT

A system, method and computer program product for managing documents. The system includes an image forming apparatus configured to display interactive menus so as to allow an operator of the image forming apparatus to interact with a document manager. The display interactive menus are downloaded from the document manager to the image forming apparatus based on a request by the operator. The document manager is configured to search for application services providers (ASPs) over a network and based on operator inputs. The document manager can search documents within the ASPs, retrieve documents and URLs, store documents and data. The system can provide basic and/or customized interactive menus displayed on the screen of the image forming apparatus.

16 Claims, 16 Drawing Sheets

U.S. PATENT DOCUMENTS

| | | | |
|---|---|---|---|
| 6,009,442 A | 12/1999 | Chen et al. | |
| 6,014,677 A | 1/2000 | Hayashi et al. | |
| 6,020,973 A | 2/2000 | Levine et al. | |
| 6,023,593 A | 2/2000 | Tomidokoro | |
| 6,023,722 A | 2/2000 | Colyer | |
| 6,057,930 A | 5/2000 | Blossey et al. | |
| 6,119,137 A | 9/2000 | Smith et al. | |
| 6,125,372 A | 9/2000 | White | |
| 6,189,069 B1 | 2/2001 | Parkes et al. | |
| 6,209,048 B1 | 3/2001 | Wolff | |
| 6,219,718 B1 | 4/2001 | Villalpando | |
| 6,262,732 B1 | 7/2001 | Coleman et al. | |
| 6,327,045 B1 | 12/2001 | Teng et al. | |
| 6,330,611 B1 | 12/2001 | Itoh et al. | |
| 6,424,424 B1 | 7/2002 | Lomas et al. | |
| 6,434,343 B1 | 8/2002 | Kobayashi et al. | |
| 6,477,567 B1 | 11/2002 | Ohara | |
| 6,480,304 B1 | 11/2002 | Os et al. | |
| 6,496,206 B1 | 12/2002 | Mernyk et al. | |
| 6,567,121 B1 | 5/2003 | Kuno | |
| 6,567,983 B1 | 5/2003 | Shiimori | |
| 6,578,067 B1 | 6/2003 | Okazaki et al. | |
| 6,684,368 B1 | 1/2004 | Hull et al. | 715/500 |
| 6,694,376 B1 | 2/2004 | Ohara | |
| 6,704,118 B1 | 3/2004 | Hull et al. | 358/1.15 |
| 6,738,841 B1 | 5/2004 | Wolff | |
| 6,785,023 B1 | 8/2004 | Iida | |
| 6,804,705 B2 * | 10/2004 | Greco et al. | 709/219 |
| 2002/0099707 A1 | 7/2002 | Matsumoto | |
| 2003/0011633 A1 | 1/2003 | Conley et al. | |
| 2003/0079132 A1 * | 4/2003 | Bryant | 713/182 |
| 2003/0167336 A1 * | 9/2003 | Iwamoto et al. | 709/229 |
| 2004/0083260 A1 * | 4/2004 | Kobayashi et al. | 709/201 |
| 2005/0021608 A1 | 1/2005 | Wolff | |
| 2007/0094358 A1 | 4/2007 | Uchida et al. | |

FOREIGN PATENT DOCUMENTS

| | | |
|---|---|---|
| EP | 0 848 339 A1 | 6/1998 |
| EP | 1011261 A2 | 6/2000 |
| EP | 1209558 A2 | 5/2002 |
| JP | 5-46558 | 2/1993 |
| JP | 6-214862 | 8/1994 |
| JP | 10-116235 | 5/1998 |
| JP | 11-261754 | 9/1999 |
| JP | 2000-330852 | 11/2000 |
| JP | 2002-132999 | 5/2002 |
| WO | WO 99/34304 | 7/1999 |

OTHER PUBLICATIONS

U.S. Appl. No. 11/612,943, filed Dec. 19, 2006, Hyakutake, et al.
U.S. Appl. No. 11/675,774, filed Feb. 16, 2007, Hyakutake, et al.
U.S. Appl. No. 11/675,125, filed Feb. 15, 2007, Uchida, et al.
Electronics for Imaging, Inc, "Job Management Guide: Fiery XJ+ 525", 1998, Available online at: http://download.support.xerox.com/pub/docs/DocuColor__30PRO/userdocs/any-os/en/FieryXJ+525__Job__Management__Guide.pdf, pp. 1-4 and 3-7.

* cited by examiner

Document Mall Indexing

Document Title _____ 555

Date 560 [10]-[30]-[00]

Access Level 565 [____]  ○ View Only
                          ○ View & Change
              [____]  ○ View Only
                          ○ View & Change

Document Mall Keyword Inputting

Keyword [_____] 570

Date 560 [10]-[30]-[00]

Document Type ▼ [Legal] 575 — Optional

Pulldown Menu →
Finance
Insurance
Engineering
Accounting
General

SYSTEM, COMPUTER PROGRAM PRODUCT AND METHOD FOR MANAGING DOCUMENTS

CROSS REFERENCE TO RELATED APPLICATIONS

This application is a divisional of U.S. application Ser. No. 09/795,438 filed Mar. 1, 2001, the entire contents of which are incorporated herein by reference.

BACKGROUND OF THE INVENTION

1. Field of the Invention

The present invention is directed to methods, computer-based systems and computer program products for managing documents or files.

2. Discussion of the Background

An application service provider (ASP) is an entity, typically a company, that offers users (individual customers, companies, enterprises, etc.) access over a network, such as the Internet, to applications and related services that would otherwise have to be located on the customer's local computer. For example, ASPs can provide searchable databases of legal, medical, financial, educational, scientific, or marketing documents. Alternatively, some companies provide in-house type ASPs wherein applications are not on the company's employee's personal computers, but instead on a company computer accessible by the employees via a company network. For the purpose of this document, the term "ASP" is thus intended to be broadly interpreted and to include a provider that allows a user to use an application not loaded on the user's computer.

An example of a conventional network of ASPs connected via the Internet is shown in FIG. 1, which shows four exemplary document ASPs 10-40 connected to an Internet 50. In this example, a user 70 may independently connect to the ASPs 10-40 via the Internet 50 and download documents, either to view on the screen of a personal computer (PC) 80, to print with a printer 82, to store in a local storage device 84 and/or a medium drive 86.

Today, there are a great number of ASPs providing various kinds of services and documents. For example, an ASP may provide legal documents, while another may provide marketing documents, yet another may provide educational, scientific, financial, or medical documents, etc. Furthermore, different ASPs may provide these documents in different formats, for example, using different graphical user interfaces (GUIs). When a user needs different kinds of documents, for example, a legal document, a financial document, a scientific document, and each of which is stored in different ASPs, the user must search, find and access an ASP that provides the desired documents. When a number of different kinds of documents are desired, the user may have to search, find and access several ASPs. This multiple searching requirement is time consuming for the user. In addition, because various ASPs may provide documents using different formats, the user may have to re-format the documents so as to obtain documents of a single format. This re-formatting is also burdensome on the user. Because most ASPs charge their customers for their services rendered, typically on a pay-per-use basis or a contract basis, the customers, or users, may have to pay several bills, one for each ASP used. This multiple billing system thus imposes an extra burden on the user.

In an effort to alleviate these problems, a system, computer program product and method of managing documents retrieved from, or stored to, ASPs were disclosed in commonly owned co-pending U.S. patent application Ser. No. 09/684,965, which is incorporated hereby by reference.

The management system, computer program product and method disclosed in Ser. No. 09/684,965 are configured to, inter alia, search for ASPs over a network; retrieve documents, URLs and other data; store documents and data at the ASPs, within a document manager, or at the user; format documents; generate and issue unified bills from a plurality of bills from a plurality of ASPs. The document manager can provide consulting advice to the user regarding document managing, and can manage the stored documents.

SUMMARY OF THE INVENTION

One object of the present invention is to provide a method, a system and a computer program product to provide user-interfaces, or menus, to permit an operator, e.g. a person using the system, to conveniently interact with an image forming apparatus, a document manager, such as the one disclosed in Ser. No. 09/684,965 and ASPs. In particular, the present invention permits an operator to take advantage of the services offered by the document manager, such as document storage at ASPs and document retrieval from ASPs, by interacting conveniently via menus displayed on an image forming apparatus, such as a multi-function digital copier. For example, the operator may request the document manager to store a document at an ASP by inputting a storage request, the document to be stored and the desired storage location using a menu displayed at the multi-function digital copier. The operator may also request the document manager to retrieve a document from an ASP by inputting a retrieval request and keywords to find the desired document using a menu displayed at the multi-function digital copier.

To achieve this and other objects, the present invention provides a computer based system configured to provide menus to interact with an image forming apparatus, a document manager and ASPs. The system according to the present invention typically includes a computer program, which receives data from operators, and/or a document manager, and/or ASPs, transforms the received data in some desired way, and then outputs the transformed data stream to an image forming apparatus. For example, the computer program can receive and output a request for searching, retrieving or saving a document. The computer program can select and transmit a menu to a screen of the image forming apparatus based on the received request. The computer program can receive and output information, such as user I.D.s, passwords, documents (e.g. scanned by the operators), names (e.g., of documents, operators, or authors), addresses (e.g., street, P.O. Box, or e-mail addresses), phone numbers, dates and times (e.g., of document creations or document requests), serial numbers (e.g., of the device that scanned the document). The computer program can select, create, request, or receive a menu based on the received operator information, and transmit the menu to the screen of the image forming apparatus. In one embodiment, the selected menu is customized to the operator of the image forming apparatus or to the image forming apparatus.

BRIEF DESCRIPTION OF THE DRAWINGS

FIGS. 5A-C show examples of menus displayed on a display screen of an image forming apparatus to interact with a document manager according to one embodiment of the present invention.

DESCRIPTION OF THE PREFERRED EMBODIMENTS

Figure 2:
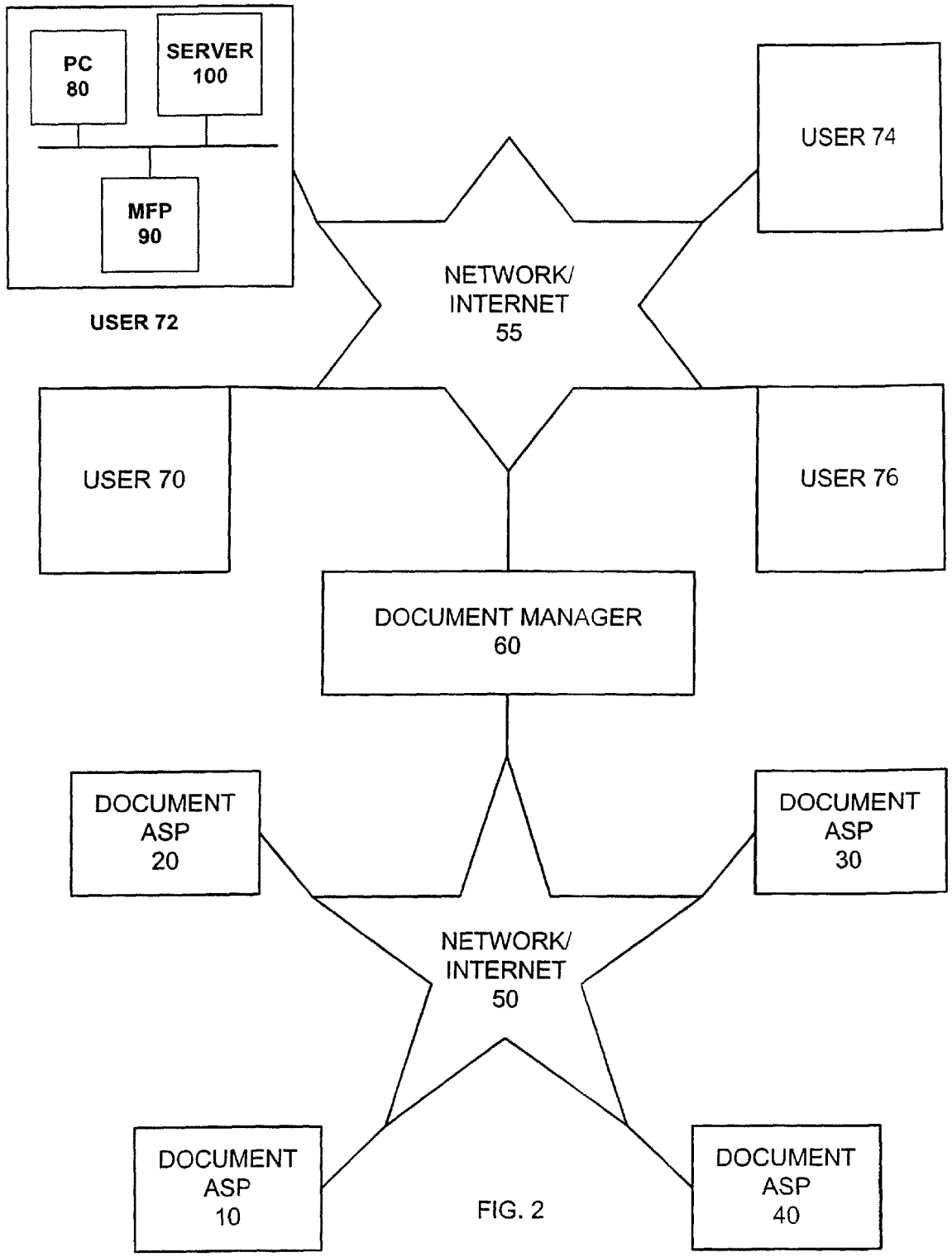
FIG. 2 is a block diagram showing an overall system configuration according to the present invention.

Referring now to the drawings, wherein like reference numerals designate identical or corresponding parts throughout the several views, FIG. 2 is a block diagram of a system for managing documents according to the present invention, and in particular to provide menus allowing an operator to interact with a document manager from a remote location, such as a multi-function digital printer. The system includes a network 50 that interconnects at least one, but preferably a plurality of ASPs 10-40, a document manager 60, and at least one user 70, but preferably a plurality of users 70, 72, 74 and 76 connected to the document manager 60 via a network 55. The users 70, 72, 74 and 76 are thus remote users with respect to the document manager 60. The networks 50 and 55 are preferably the Internet, but can also be a local area network, a wide area network, any type of network such as an intranet, an extranet, or a combination thereof. An extranet may be used to provide controlled access to external users, for example through the Internet. How the users 70 and the document manager 60 can be connected to the Internet 50 and 55 is well-known in the art and is explained for example, in part 38 of "How Computers Work", by Ron White, Que Corporation, pps. 340-349, September, 1999, ISBN: 0-7897-2112-0, the entire content of this book being hereby incorporated by reference. Other communications links for the networks 50 and 55, such as a virtual private network, or a wireless link, may be used as well.

As shown in FIG. 2, the user 72 (and similarly users 70, 74 and 76) can include a PC 80, an multi-function printer (MFP) 90, and a server 100 which can provide access to a group ware database (not shown). Of course, user 72 (and similarly users 70, 74 and 76) may also include a printer 82, a local storage device 84, or a medium drive 86, or a combination of such devices. Alternatively, the users 70, 72, 74 and 76 may also include other multifunction devices such as the Ricoh eCabinet™.

As shown in FIG. 2, the user 72 (and similarly users 70, 74 and 76) may interact (exchange data) with the document manager 60 via the network/Internet 55, so as to benefit from a number of services provided by the document manager 60, which are described in detail in 09/684,965. For example, the user 72 may provide the document manager 60 with a request for searching and retrieving a document, or a request for storing a document scanned by the MFP 90 at an ASP. The user 72 may also provide the document manager 60 with other information such as user I.D.s, passwords, the name of the person scanning the document, the name of the author of the document, the date and time of the scanning, the version of the document, the MFP 90's serial number and/or location.

In a preferred embodiment, the MFP 90 provides interactive menus based on information inputted by the operator of the MFP 90, so as to allow the operator to conveniently take advantage of the services provided by the document manager 60. These interactive menus can be downloaded by the MFP 90 from the document manager 60 via the network 55. The MFP 90 can display the interactive menus on a display screen for the operator. In a preferred embodiment, a browser such as Internet Explorer™ by Microsoft Corp. or Netscape Navigator™ by Netscape is installed in the MFP 90 so that the operator of the MFP 90 can access the document manager 60 using browsing operations. The MFP 90 is described in detail below in connection with FIGS. 3-6.

Figure 3:
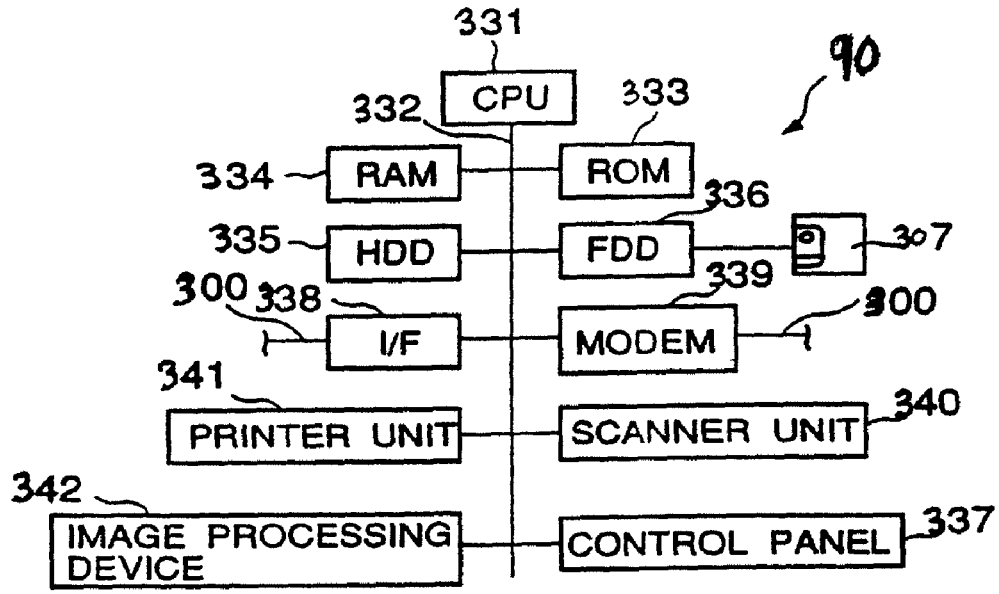
FIG. 3 is a block diagram illustrating an image forming apparatus according to one embodiment of the present invention.
Figure 4:
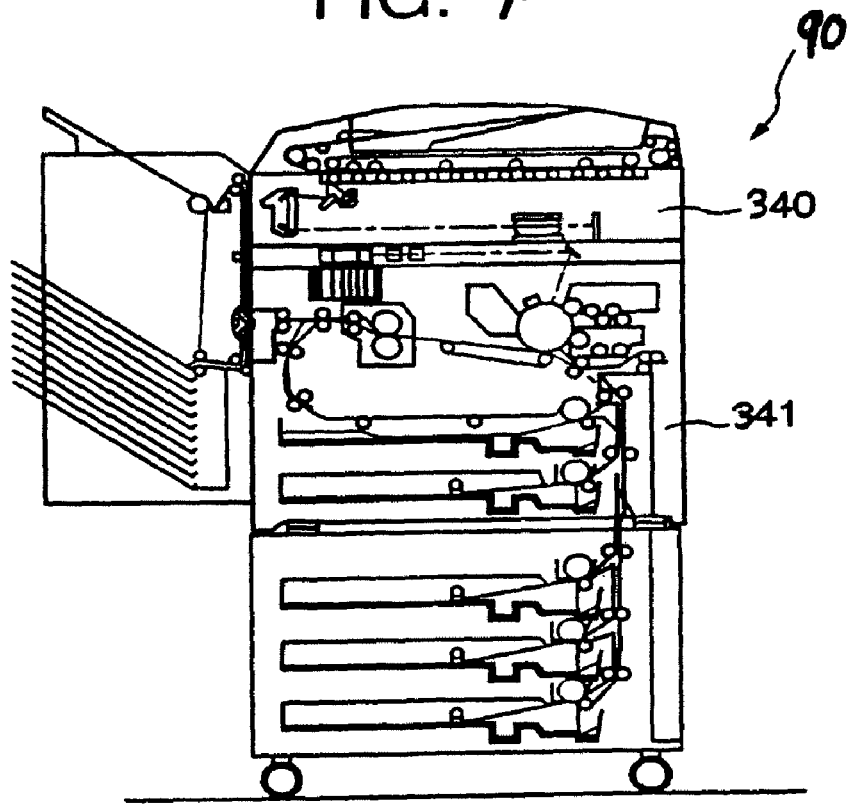
FIG. 4 is a schematic representation of an image forming apparatus according to one embodiment of the present invention.

The MFP 90 shown in FIGS. 3-4 includes a central processing unit (CPU) 331, and various elements are connected to the CPU 331 by an internal bus 332. The CPU 331 services multiple tasks while monitoring the state of the MFP 90. The elements connected to the CPU 331 include a read only memory (ROM) 333, a random access memory (RAM) 334, a hard disk drive (HDD) 335, a floppy disk drive (FDD) 336 capable of receiving a floppy disk 307, a communication interface (I/F) 338, and a modem unit 339. In addition, a control panel 337, a scanner unit 340, a printer unit 341, and an image processing device 342 can be connected to the CPU 331 by the bus 332. Both the I/F 338 and the modem unit 339 are connected to a communication network 300, which is further connected to a public telephone line (not shown). MFP 90 can thus be connected to PC 80, or network 55 via the communication network 300. According to one embodiment of the present invention, the MFP 90 can be implemented using the server shown in U.S. Pat. No. 5,928,335, the entire content of which is hereby incorporated by reference.

In the embodiment where MFP 90 includes a digital copier, the modem unit 339, the scanner unit 340, the printer unit 341, and the image processing device 342 are collectively called the image processing units of the MFP 90. These elements correspond to the hardware of the MFP 90 which carry out the image processing functions as the digital copier.

In a preferred embodiment, program code instructions for the MFP 90 may be stored in the HDD 335 and executed by the CPU 331. These instructions may be menu management instructions, such as instructions to create, select, retrieve, transmit, display, and store menus. In other words, these instructions may be the instructions to perform the method steps described in detail below with corresponding FIGS. 7-15. These instructions permit the MFP 90 to interact with the document manager 60 and to control the control panel 337 and the image processing units of the MFP 90. These instructions may also be image processing instructions.

Alternatively, the program code instructions may be stored on the floppy 307 and read by the FDD 336 and executed by the CPU 331 to carry out the instructions. Alternatively, the program code instructions may be read from the floppy 307 to the HDD 335. Alternatively, the program code instructions may be loaded to the ROM 333. It is therefore understood that in the present invention any of the HHD 335, the floppy disk 307, the RAM 334, and the ROM 333 correspond to a computer readable storage medium capable of storing program code instructions. Other devices and medium that can store the instructions according to the present invention include for example magnetic disks, optical disks including DVDs, magneto-optical disks such as Mos, and semiconductor memory cards such as PC cards.

In a preferred embodiment, the control panel 337 includes a display screen 142 (see FIGS. 5A-C and 6A-B) that displays menus allowing the operator of the MFP 90 to interact with the document manager 60. The display screen 142 may be a liquid crystal display (LCD), a plasma display device, or a cathode ray tube (CRT) diplay. The display screen 142 does not have to be integral with, or embedded in, the control panel 337, but may simply be coupled to the control panel 337 by either a wire or a wireless connection. The control panel 337 may include keys for inputting information or requesting various operations. Alternatively, the control panel 337 and the display screen 142 may be operated by a keyboard, a mouse, a remote control, touching the display screen 142, voice recognition, or eye-movement tracking, or a combination thereof.

Figure 5A:
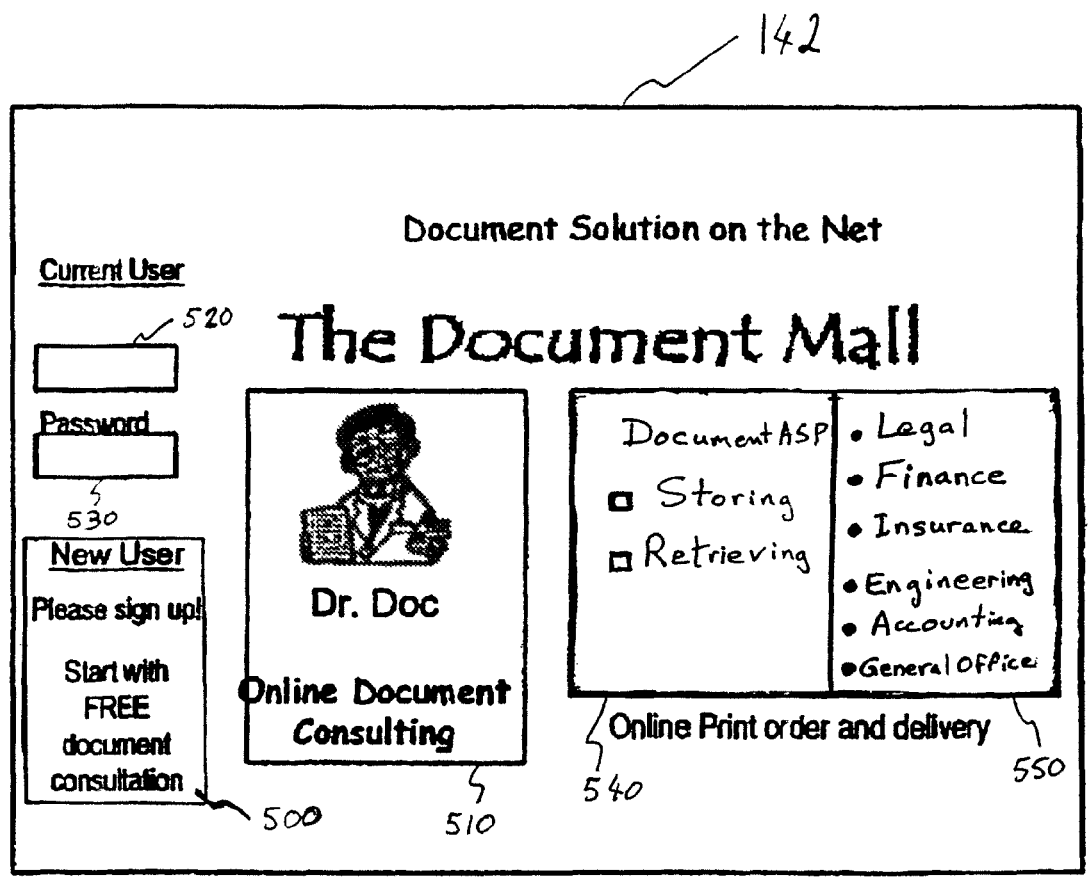

An example of a menu displayed on the display screen 142 is shown in FIG. 5A where the display screen 142 is displaying a menu that allows an operator of the MFP 90 to interact with the document manager 60. In this example, the document manager 60 is referred to as "The Document Mall" on the display screen 142. The display screen 142 can have one or a plurality of message areas, such as message area 500. For example, message area 500 can inform the operator of various options or requirements, such as the requirement to sign up if the operator (or "User") is new, or offering the option to start with a free document consultation. The display screen 142 can have one or a plurality of selection buttons, such as selection button 510, which may be selected to start an online document consulting session provided by document manager 60. The display screen 142 can have one or a plurality of interactive areas, such as interactive areas 520, 530, 540 and 550. In this example, interactive areas 520 and 530 allow the operator to enter a user I.D. and a user password, respectively. Interactive area 540 allows the operator to select a request to store a document at an ASP using the document manager 60, and/or to retrieve a document from an ASP using document manager 60. Interactive area 550 allows the operator to identify the type of document being stored or retrieved, such as legal, financial, insurance-related, engineering-related, accounting-related, or general office related. Of course, other types of documents may be displayed on the display screen 142. Selection button 510 and interactive areas 520-550 may be activated for example by clicking a button on a mouse or a remote control, pressing a key (or keys) on a keyboard or on the control panel 337, touching the display screen 142, speaking a command, etc.

After one of the document mall options (e.g., storing or retrieving) from the menu displayed on the display screen 142 shown in FIG. 5A is selected, the MFP 90 can display a follow up menu on display screen 142. For example, if the storing option is selected, the menu shown in FIG. 5B can be displayed to prompt the operator of the MFP 90 to enter the title of the document in a document title window 555, the date of the request in a date windows 560, and the access level of the document (described below) in an access level windows 565.

The operator may also indicate whether the document should be stored as a "view only" document, or as a "view & change" document. If the document is stored as a "view only" document, any future retrieval of the document only permits viewing the document without editing, with the possible exception of adding a watermark to the document for printing. If the document is stored as a "view & change" document, a future operator may retrieve the document to view it and to edit it.

The concept of the access level of a document was described in detail in 09/684,965. Briefly, the access levels identify the documents which a specific user (or operator) can access at the ASPs via the document manager 60. The user 72 (and similarly users 70, 74 and 76) may assign an access level to each document stored at the ASP. During a retrieval operation, the user's ID is transmitted to the document manager 60 and the document manager 60 retrieves documents that match the user's access level. As a result, security management can be accomplished and the search time can be reduced. The access level for each user can be stored in the document manager 60. When documents are stored in the ASPs, the access level can be set with each document. The access level for each stored document can also be stored at the ASPs. When the document manager 60 executes a document retrieval operation, the document manager's search engine and/or the ASPs' search engine execute the retrieval operation only for documents having an access level matching the user's access level. Consequently, the retrieval time is shortened and high security documents can be accessed by only appropriate users.

If the retrieving option is selected in FIG. 5A, the menu shown in FIG. 5C can be displayed to prompt the operator of the MFP 90 to enter one or a plurality of keywords in a keyword window 570, the date in the date window 560 and optionally, the type of document being retrieved in a document type window 575. The document type window 575 may have a pull-down menu to select one of a plurality of document types, such as legal, finance, insurance, engineering, accounting, or general.

FIGS. 5A-C are examples of menus displayed on the display screen 142 to permit an operator of the MFP 90 to interact with the document manager 60. Other menus, with different layouts, different names, different designs, different fonts, different sizes for the areas and buttons, and different options are possible and are within the spirit of the present invention.

Figure 6A:
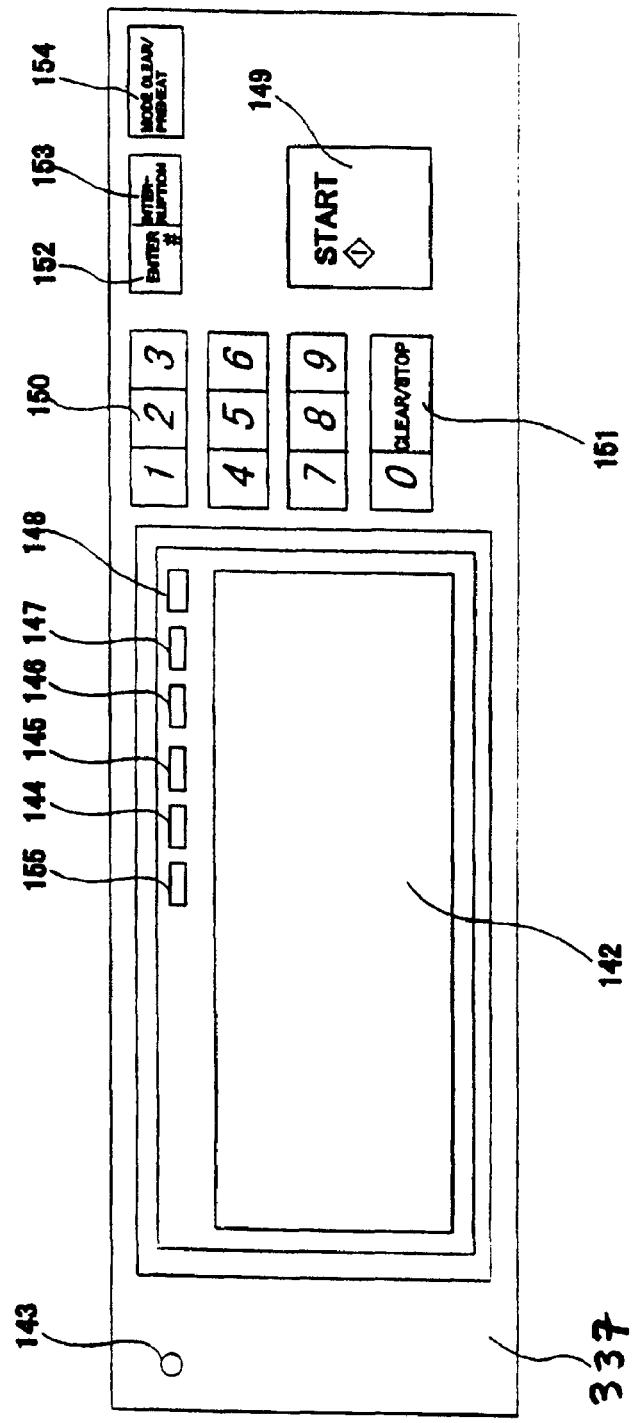
FIGS. 6A shows a schematic representation of a control panel for an image forming apparatus according to one embodiment of the present invention.

An example of the control panel 337 for MFP 90 with the display screen 142 which may be used for the present invention is shown in FIG. 6A. The control panel 337 can include a contrast amount key 143 adjacent to the display screen 142 for changing a contrast of the display screen 142. The control panel 337 can also include a start key 149 for starting a copying operation or ASP document operation when depressed, a ten key keypad 150 for inputting data. The control panel 337 may also include an alphabetic or alphanumeric keypad (not shown). These keypads can be used for example to enter the operator's user I.D., password, document name and type of document to store or retrieve, location to store the document, keywords, dates, access level and other information to send to the document manager 60. Of course, the key pad 150 can also be used to enter copy mode information, such as the number of copies, or the percentage magnification/reduction desired. The control panel 337 may also include a set number clear and copy stop key 151 for either clearing preset numbers or stopping a copying operation when depressed. In the ASP document mode, the key 151 can also be used to delete the alphabetic input from the key pad 150. A confirming key 152 may also be used to confirm information to use the MFP 90 as a copy machine, such as the number of copies, magnification/reduction and/or a margin of a copy sheet. The control panel 337 may also include an interruption copy key 153 for interrupting a document storing operation, or a document retrieving operation, or a copying operation when depressed. A preheat key 154 for preheating a fixing roller, and/or a mode-clear key 154 clearing a preset mode can also be included to the control panel 337. Keys 155 and 144-148 of control panel 337 can be used for other operations of the various modes of the MFP 90. According to one embodiment of the present invention, the control panel 337 can be implemented using the control panel shown in U.S. Pat. No. 6,023,593, the entire content of which is hereby incorporated by reference.

Figure 6B:
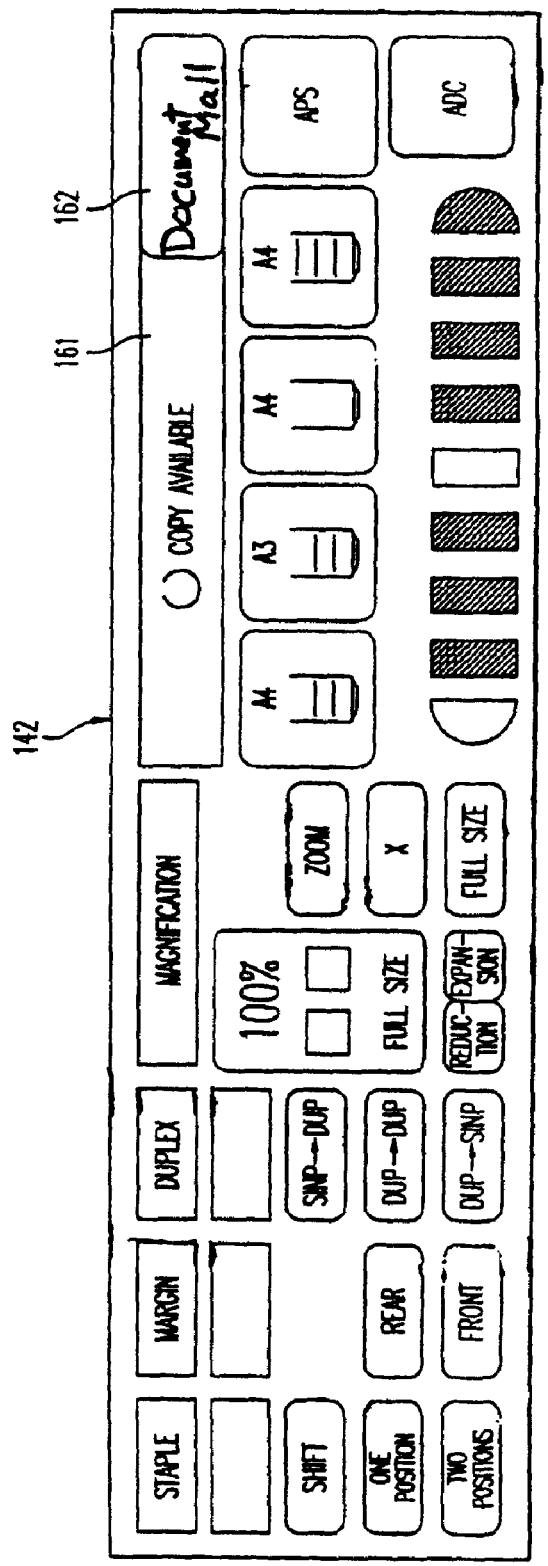
FIGS. 6B shows a schematic representation of a menu displayed on a display screen of an image forming apparatus according to one embodiment of the present invention.

The display screen 142 shown in FIG. 5A-C and 6A-B can be made of a fill dot displaying element, for example, a liquid crystal, a fluorescent material, and can include a matrix touch panel in a state of a sheet overlaid on the full dot displaying element. An example of an interactive menu displayed on display screen 142 is shown in FIG. 6B. The interactive menu shown in FIG. 6B can be stored in and read out from the RAM 334 of MFP 90. In other words, the interactive menu shown in FIG. 6B can be displayed on display screen 142 without a connection to a network connection between the MFP 90 and the document manager 60. In a preferred embodiment, the interactive menu shown in FIG. 6B is a basic menu (or "basic screen"), which is read from the RAM 334 and displayed when the MFP 90 is turned on. In this embodiment, the display screen 142 can be used to display one or a plurality of copy options and messages, for example to select a paper tray, to request stapling of the copies, to reduce or magnify, to set margins, etc. In other words, the operator of the MFP 90 can perform copying and faxing operations via control panel 337 without being connected to any network. In addition to these copy mode settings and messages, the interactive menu displayed on the display screen 142 can have a "Document Mall" selection button 162. In this example, the "Document Mall" selection button 162 is positioned next to a message display area 161, which may display copy mode messages and/or ASP document mode messages. The operator of the MFP 90 can thus select the ASP document mode, for example by touching the "Document Mall" selection button 162 and the start key 149. Once the ASP document mode is selected via the "Document Mall" selection button 162, the MFP 90 establishes a connection between the MFP 90 and the document manager 60. Interactive menus can then be downloaded from the document manager 60 to the MFP 90, for example through a browsing operation. For example, the menu shown in FIG. 5A can be first downloaded and displayed on display screen 142. Based on input from the operator of the MFP 90 via this menu, the MFP 90 then downloads other menus form the document manager 60. For example, the menu shown in FIG. 5B can be downloaded from the document manager 60 if the operator requests a document storing operation. Similarly, the menu shown in FIG. 5C can be downloaded from the document manager 60 if the operator requests a document retrieving operation.

Advantageously, once the ASP document mode is selected, e.g. via the "Document Mall" selection button 162, the display screen 142 can display a menu for document ASP modes that is customized to the operator of the MFP 90. For example, upon entering a user I.D. and a password, the MFP 90 displays a customized menu to permit the operator to interact with the document manager 60 on a personalized basis. The customized menus can be stored in a storage device of the document manager 60 and downloaded from the document manager 60 to the MFP 90 via the network 55. In one embodiment, the operator of the MFP 90 enters the user I.D. and the password using a default ASP document menu displayed after the ASP document mode is selected. The document manager 60 then requests the desired customized menu using a look-up table stored for example in one of the document manager 60's storage devices. For example, an operator "A" enters her user I.D. at the control panel 337, which prompts the document manager 60 to select an ASP document mode menu customized for the ABC company for which operator "A" works. The document manager 60 thus can provide the operator "A" with a company level customization. Alternatively, or in addition, an operator "B" enters her user I.D. which prompts the document manager 60 to select a menu customized for the legal department of the DEF company for which operator "B" works. The document manager 60 thus can provide the operator "B" with a group (or department) level customization. Alternatively, or in addition, an operator "C" enters her user I.D. which prompts the document manager 60 to select a menu customized for the operator "C". The document manager 60 thus can provide the operator "C" with an individual level customization.

Advantageously, if the MFP 90 is part of a system that utilizes group ware such as Lotus Notes, the company name, the group or department name, and/or the individual name can be read out from the group ware database and are selected from the database. The group ware database access can be particularly useful when the access level for storing documents is set. If the operator of the MFP 90 is storing some documents in the ASP, he or she can set the access level for each document. The access level can be changed for each person, for example, person "E" can be designated as a "view only" person, and person "F" can be designated as a "view and change" person. In order to designate the access level to the document for each person, the operator can select individuals who can access the documents from the group ware address database, and can designate the access level to the documents for each selected person. In order to do so, the group ware database, in particular the group ware address database, is connected to the MFP 90, and can be accessed from the MFP 90 for example via server 100 and/or through a LAN.

In another embodiment, the display screen 142 can display a menu for ASP document modes that is customized to the MFP 90.

FIGS. 7-15 show flowcharts illustrating a method of managing documents according to the present invention, which can be implemented by the systems and devices shown in FIGS. 2-6. In one embodiment of the present invention, the MFP 90 shown in FIGS. 3-4 performs the method described below. The method described below is described based on this embodiment, wherein the operator of the MFP 90 uses the control panel 337 and the display screen 142 of the MFP 90 to interact with the document manager 60. The method is thus described by explaining the steps performed by the MFP 90 which interacts with the document manager 60. Of course, the following method steps are not intended to be limiting, but can be modified, omitted, reordered so as to stay within the spirit of the present invention.

Figure 7:
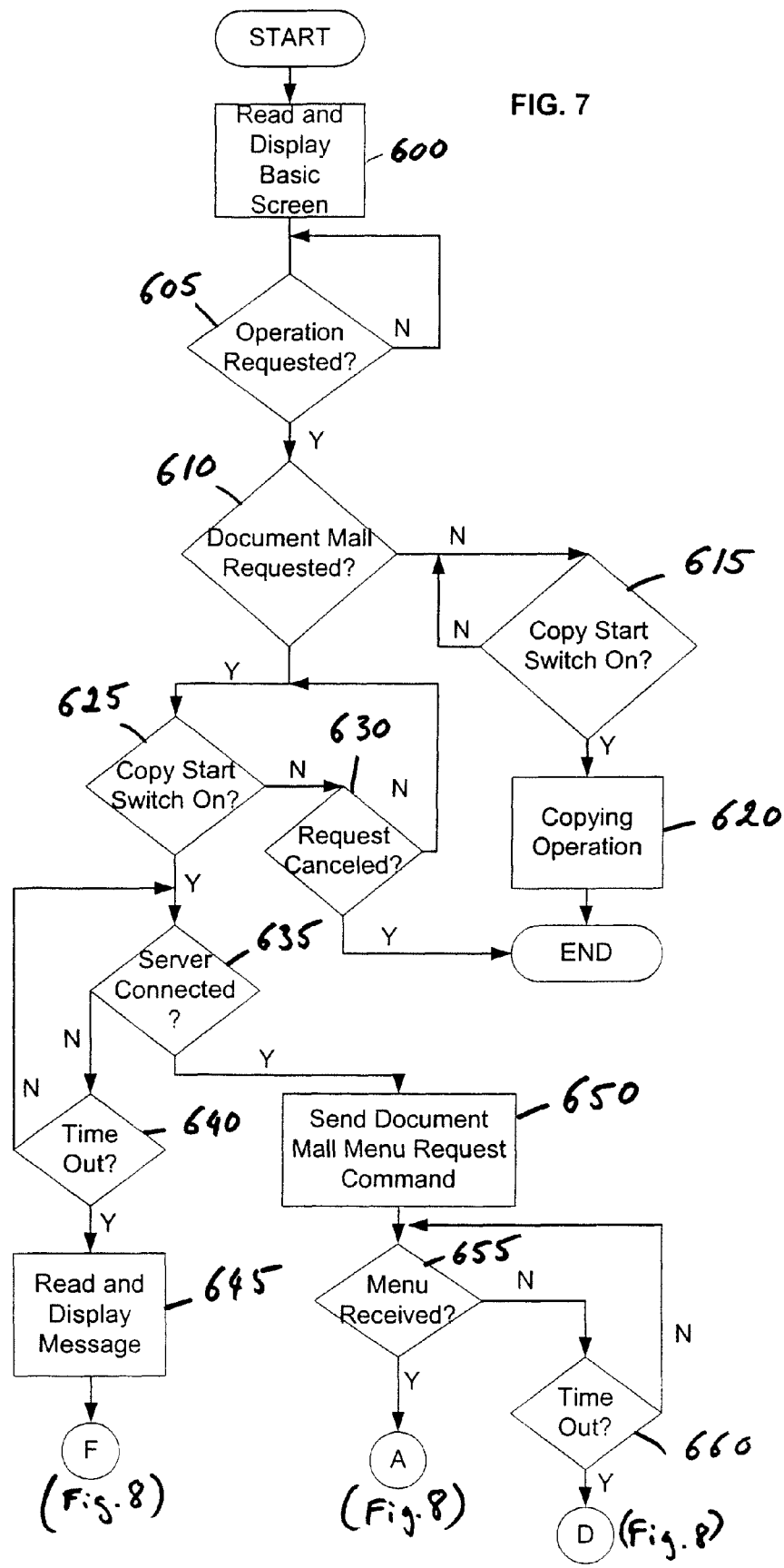
FIGS. 7-11 show flowcharts of a method of managing documents from an image forming apparatus according to one embodiment of the present invention.

Before using the MFP 90, the operator has typically already been registered with the document manager 60 and her account information (user I.D. password, customization information, etc) has been registered. As shown in FIG. 7, at step 600 the MFP 90 reads a basic menu from its RAM 334 and displays the basic menu on its display screen 142. This basic menu can be for example the menu shown in FIG. 6B. At step 605, the MFP 90 inquires whether an operation is requested. If an operation is not requested, the MFP 90 loops until an operation is requested. At step 610, the MFP 90 inquires whether the operator requested access to the Document Mall, i.e. requested to use the document manager 60. For example, this request may have been entered by selecting the "Document Mall" button 162 shown in FIG. 6B. If the Document Mall was not requested, the MFP 90 inquires at step 615 whether the copy start switch is turned on. The copy start switch can be turned on by depressing the key start 149 of control panel 337 (see FIG. 6A). Once the copy start switch is on, the MFP 90 performs copying operations at step 620, then ends its routine.

If the Document Mall was requested at step 610, the MFP inquires at step 625 whether the copy start switch is turned on, e.g. by depressing the key start 149 of control panel 337. If the copy start switch is not on, the MFP 90 inquires at step 630 whether the request was canceled. If the request was canceled, the MFP 90 ends its routine. Otherwise, the MFP 90 loops back to step 625. Once the copy start switch is on, the MFP 90 inquires at step 635 whether the document manager 60 is connected to the MFP 90. If the document manager 60 is not connected, the MFP 90 inquires at step 640 whether a time out error occurred. If no time out error occurred, the MFP 90 loops back to step 635. If a time out error occurred, the MFP 90 reads at step 645 the error message from its RAM 334 and displays the message on its display screen 142. For example, the error message can be displayed on the message display portion 161 shown in FIG. 6B. The MFP 90 then goes to step 695 (FIG. 8) and reads the basic menu from its RAM 334 and displays the basic menu on its display screen 142.

Returning to step 635, if the document manager 60 is connected to the MFP 90, the MFP 90 sends at step 650 a Document Mall menu request command to the document manager 60. The MFP 90 inquires at step 655 whether the menu is received from the document manager 60. If the menu is not received, the MFP 90 inquires at step 660 whether a time out error occurred. If no time out error occurred, the MFP 90 loops back to step 655. If a time out error occurred, the MFP 90 goes to step 690 (FIG. 8) and disconnects the connection with the document manager 60. Going back to step 655, if the menu is received from the document manager 60 through the network 55, the MFP 90 displays the menu at step 665 (FIG. 8) on its display screen 142. The MFP 90 inquires at step 670 whether the user I.D. and password are inputted, and loops until these entries are inputted. Once the user I.D. and password are inputted, the MFP 90 inquires at step 675 whether the request is a storing request, i.e. whether the operator wants to store a document at an ASP via the document manager 60. If the request is not a storing request, the MFP 90 inquires at step 680 whether the request is a retrieve request, i.e. whether the operator wants to retrieve a document from an ASP via the document manager 60. If the request is not a retrieve request, the MFP 90 inquires at step 685 whether the request is canceled. If the request is not canceled, the MFP 90 loops back to step 675. If the request is canceled, the MFP 90 disconnects the communication with the document manager 60 at step 690. At step 695, the MFP 90 reads the basic menu from its RAM 334 and displays this basic menu on its display screen 142. The MFP 90 then ends its routine.

Figure 8:
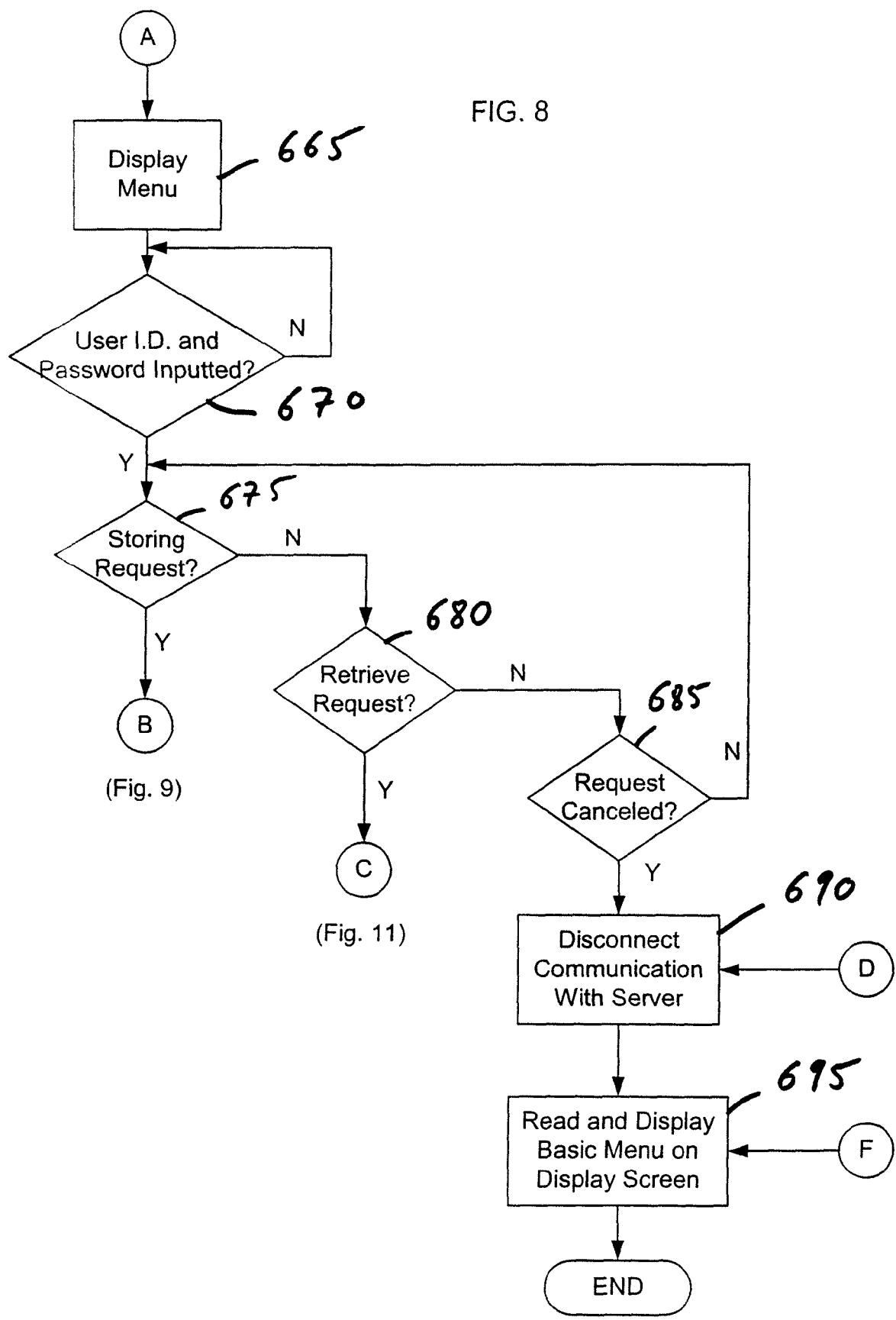

Returning to step 675, if the request is a storage request, the MFP 90 goes to step 700 (FIG. 9) and inquires whether the storage location is inputted. If the storage location is not inputted, the MFP 90 inquires at step 705 whether the request is canceled. If the request is canceled, the MFP 90 goes to step 690 (FIG. 8) and disconnects the communication with the document manager 60. If the request is not canceled, the MFP 90 loops back to step 700. Once the storage location is inputted, the MFP 90 inquires at step 710 whether the storage location is an ASP. If the storage location is not an ASP, the MFP 90 inquires at step 715 whether the document to be stored is set on the MFP 90 for copying/scanning. For example, the document may be set on the MFP 90's glass plate or on the MFP 90's automated document feeder. If the document is not set, the MFP 90 inquires at step 720 whether the request is canceled. If the request is not canceled, the MFP loops back to step 715. If the request is canceled, the MFP 90 goes to step 690 (FIG. 8). Once the document is set, the MFP 90 reads the document at step 725 and stores the document in the designated location at step 730. The designated location can be a local storage device, for example any one of the storage devices of MFP 90, such as the floppy disk 307, the FHD 335, the RAM 334, and/or the ROM 333. After storing the document, the MFP goes to step 690 (FIG. 8).

Returning to step 710, if the storage location is an ASP, the MFP 90 displays a menu for entry of the access level of the document. Then, the MFP 90 inquires at step 740 whether the access level for the document is inputted. If the access level is not inputted, the MFP 90 inquires at step 745 whether the request is canceled. If the request is not canceled, the MFP loops back to step 740. If the request is canceled, the MFP 90 goes to step 690 (FIG. 8). Once the access level is inputted, the MFP 90 inquires at step 750 whether the document type is inputted. If the document type is not inputted, the MFP 90 inquires at step 745 whether the request is canceled. If the request is not canceled, the MFP loops back to step 740. If the request is canceled, the MFP 90 goes to step 690 (FIG. 8). Once the document type is inputted, the MFP 90 inquires at step 755 whether the document is set on the MFP for copying/scanning. If the document is not set, the MFP 90 inquires at step 760 whether the request is canceled. If the request is not canceled, the MFP loops back to step 755. If the request is canceled, the MFP 90 goes to step 690 (FIG. 8). Once the document is set, the MFP 90 reads the document at step 765 and stores the document at step 770. For example, the MFP 90 stores the document in the HDD 335.

Figure 9:
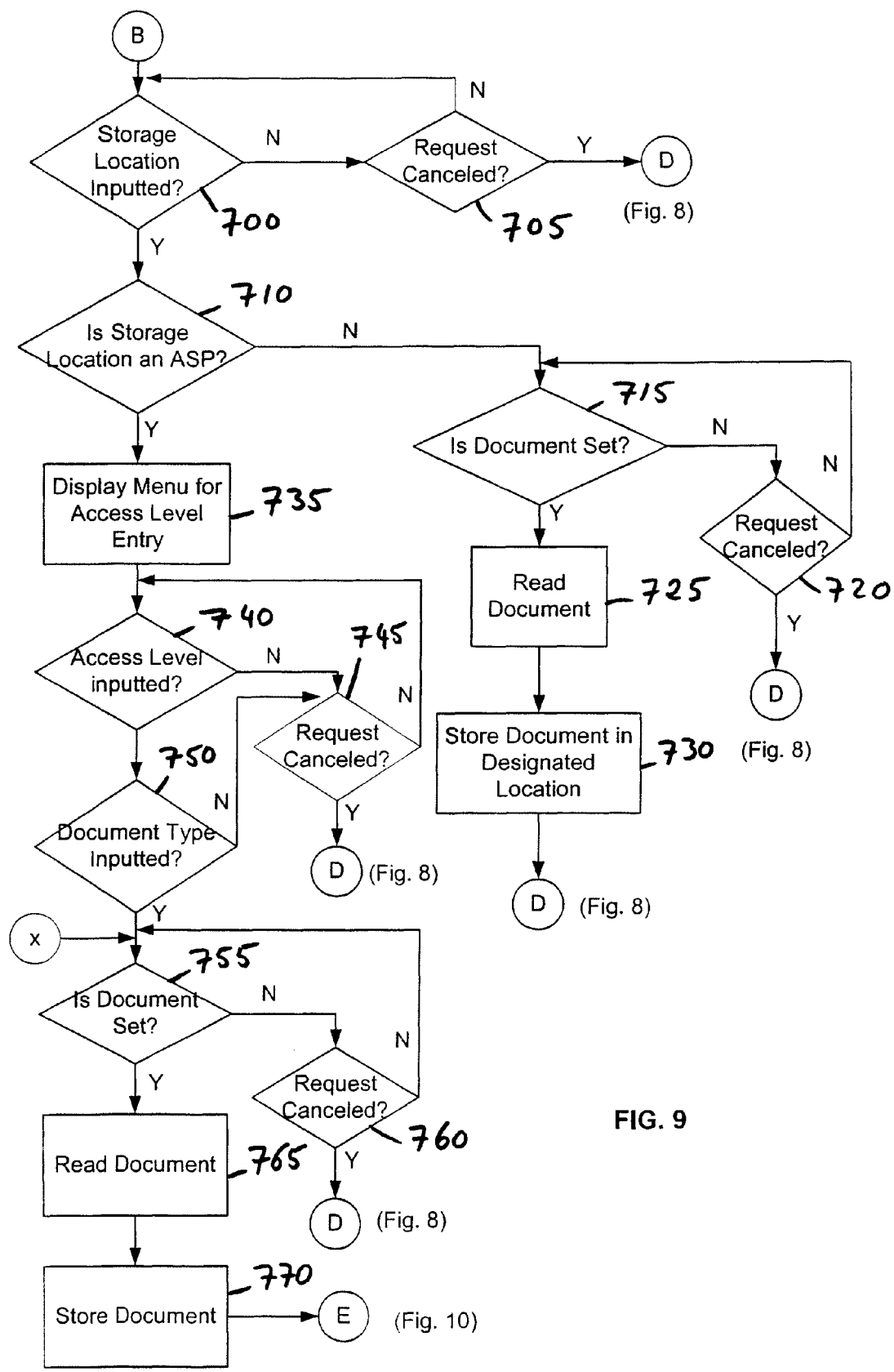
Figure 10:
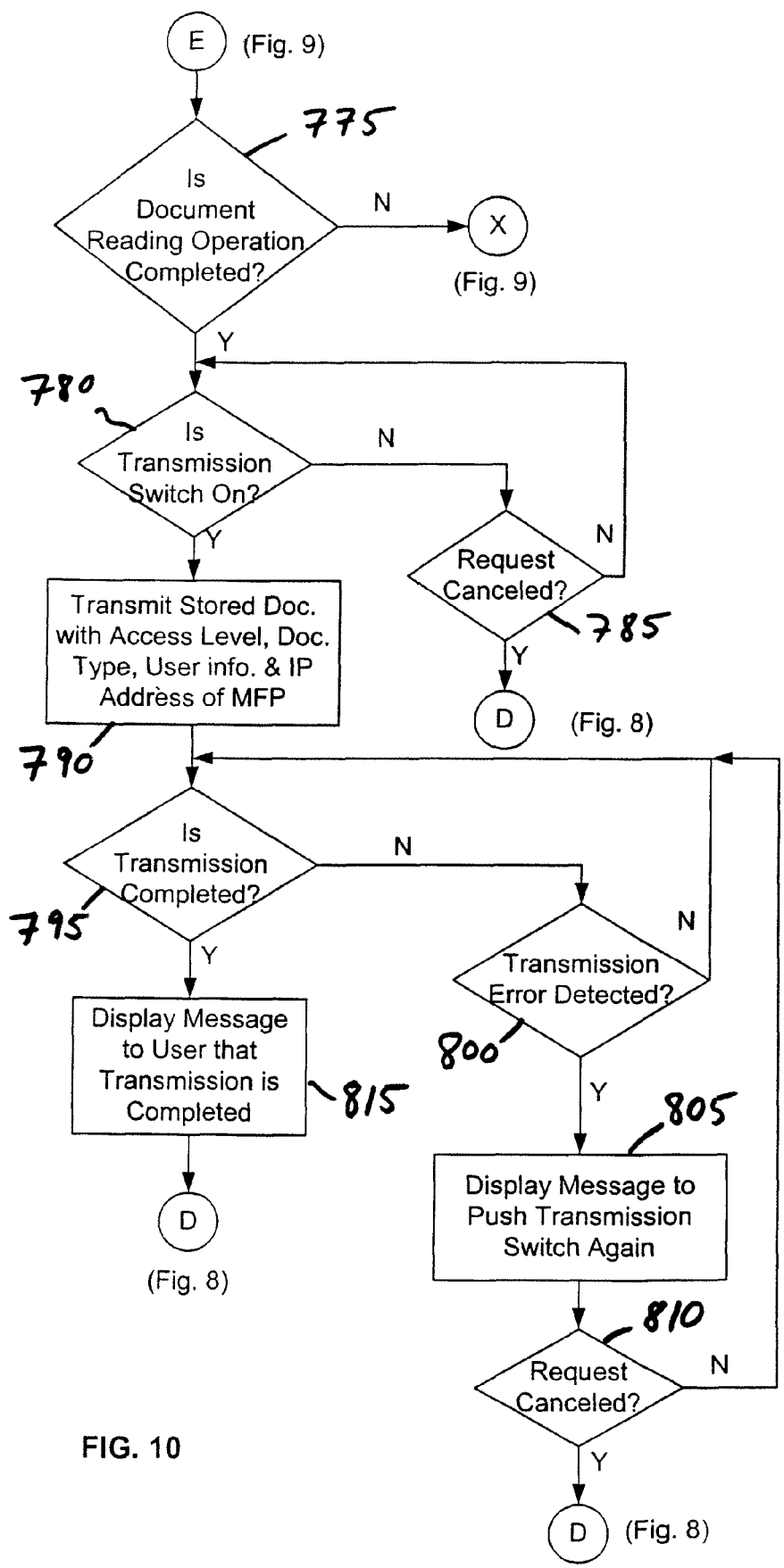
Figure 11:
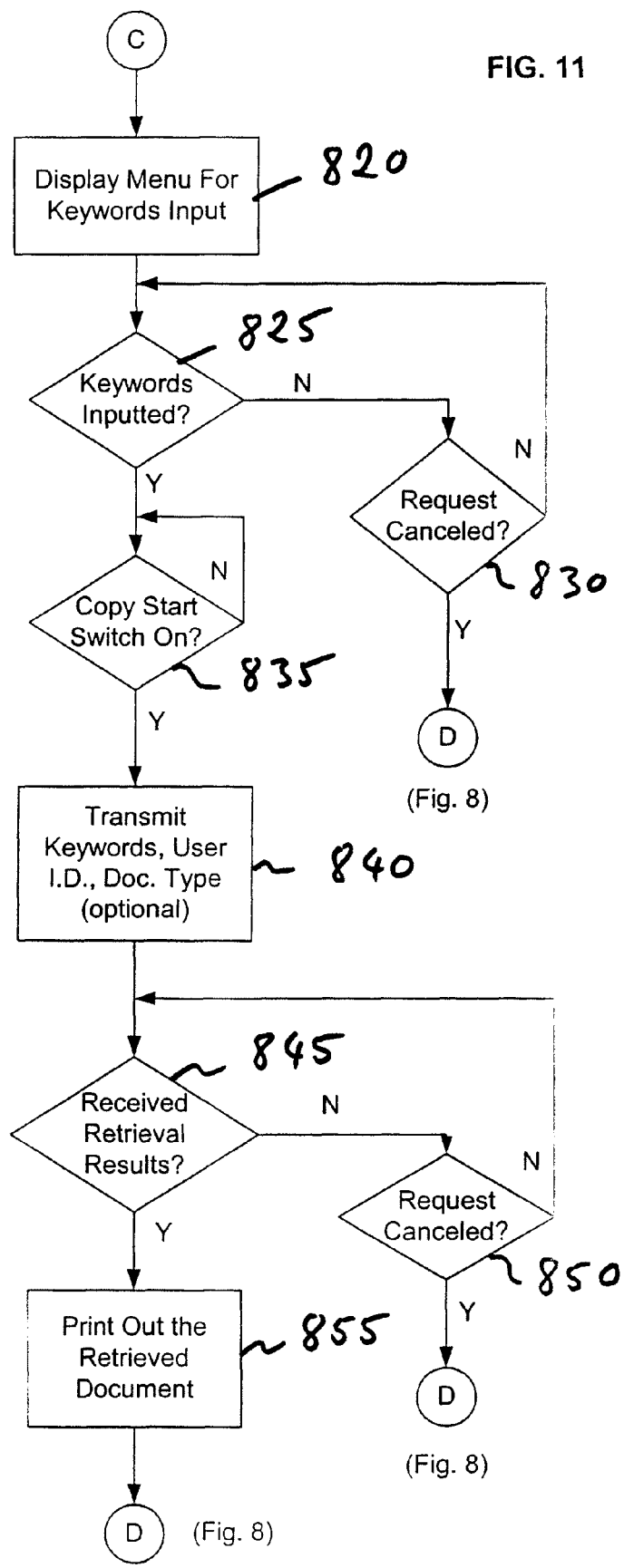

After storing the document, the MFP 90 inquires at step 775 (FIG. 10) whether the document reading operation is completed. The document reading operation may not be completed because the documents contains several pages that must be independently set, copied/scanned and stored. If the document reading operation is not completed, the MFP 90 loops back to step 755 (FIG. 9). Once the document reading operation is completed, the MFP 90 inquires at step 780 whether the transmission switch is on. For example, the transmission switch can be turned on by depressing the start key 149 of control panel 337. If the transmission switch is not on, the MFP 90 inquires at step 785 whether the request is canceled. If the request is canceled, the MFP 90 goes to step 690 (FIG. 8) to disconnect the connection with the document manager 60. If the request is not canceled, the MFP loops back to step 780. Once the transmission switch is on, the MFP 90 transmits at step 790 the stored document with the access level, the document type, the user information and IP address of the MFP to the document manager 60. The MFP 90 inquires at step 795 whether the transmission is completed. If the transmission is not completed, the MFP 90 inquires at step 800 whether a transmission error is detected. If no transmission error is detected, the MFP 90 loops back to step 795. If a transmission error is detected, the MFP 90 displays at step 805 a message on the display screen 142 to help the operator of the MFP 90 correct the error. For example, the MFP 90 can display a message instructing the operator of the MFP 90 to push the transmission switch again. After displaying the message, the MFP 90 inquires at step 810 whether the request is canceled. If the request is cancel, the MFP 90 goes to step 690 (FIG. 8). Otherwise, the MFP loops back to step 795. Once the transmission is completed, the MFP 90 displays at step 815 a message indicating that the transmission is completed. The message can be stored in and read from the RAM 334. The MFP then goes to step 690 (FIG. 8) to disconnect the connection with the document manager 60, read and display the basic menu, and end its ASP mode operation.

Returning to step 680 (FIG. 8), if the request is a retrieve request, the MFP 90 goes to step 820 (FIG. 11) and changes the menu on its display screen 142 so as to instruct the operator (user) to input keywords for the retrieval operation to be performed by the document manager 60. Optionally, the menu can prompt the user to enter the document type of the document to be retrieved. For example, the MFP 90 can display the menu shown in FIG. 5C. The MFP 90 inquires at step 825 whether the keyword or keywords are inputted. If the keywords are not inputted, the MFP 90 inquires at step 830 whether the request is canceled. If the request is canceled, the MFP goes to step 690 (FIG. 8) and disconnects the connection to the document manager 60. If the request is not canceled, the MFP 90 loops back to step 825. Once the keywords are inputted, the MFP 90 inquires at step 835 whether the copy start switch is on. The MFP 90 loops until the copy start switch is on. Once the copy start switch is on, the MFP 90 transmits at step 840 the keywords, the user I.D., and optionally the document type, to the document manager 60. The MFP 90 inquires at step 845 whether the retrieval results are received from the document manager 60. If the results are not received, the MFP 90 inquires at step 850 whether the request is canceled. If the request is canceled, the MFP 90 goes to step 690 (FIG. 8) to disconnect the connection with the document manager 60. If the request is not canceled, the MFP 90 loops back to step 845. Once the retrieval results are received, the MFP 90 prints out at step 855 the retrieved document. In an optional embodiment, the MFP 90 merges watermark information with the document and prints out the document with the embedded watermark. Once the retrieved document is printed out, the MFP goes to step 690 (FIG. 8) to disconnect the connection with the document manager 60, read and display the basic menu and end its ASP mode operation.

Figure 12:
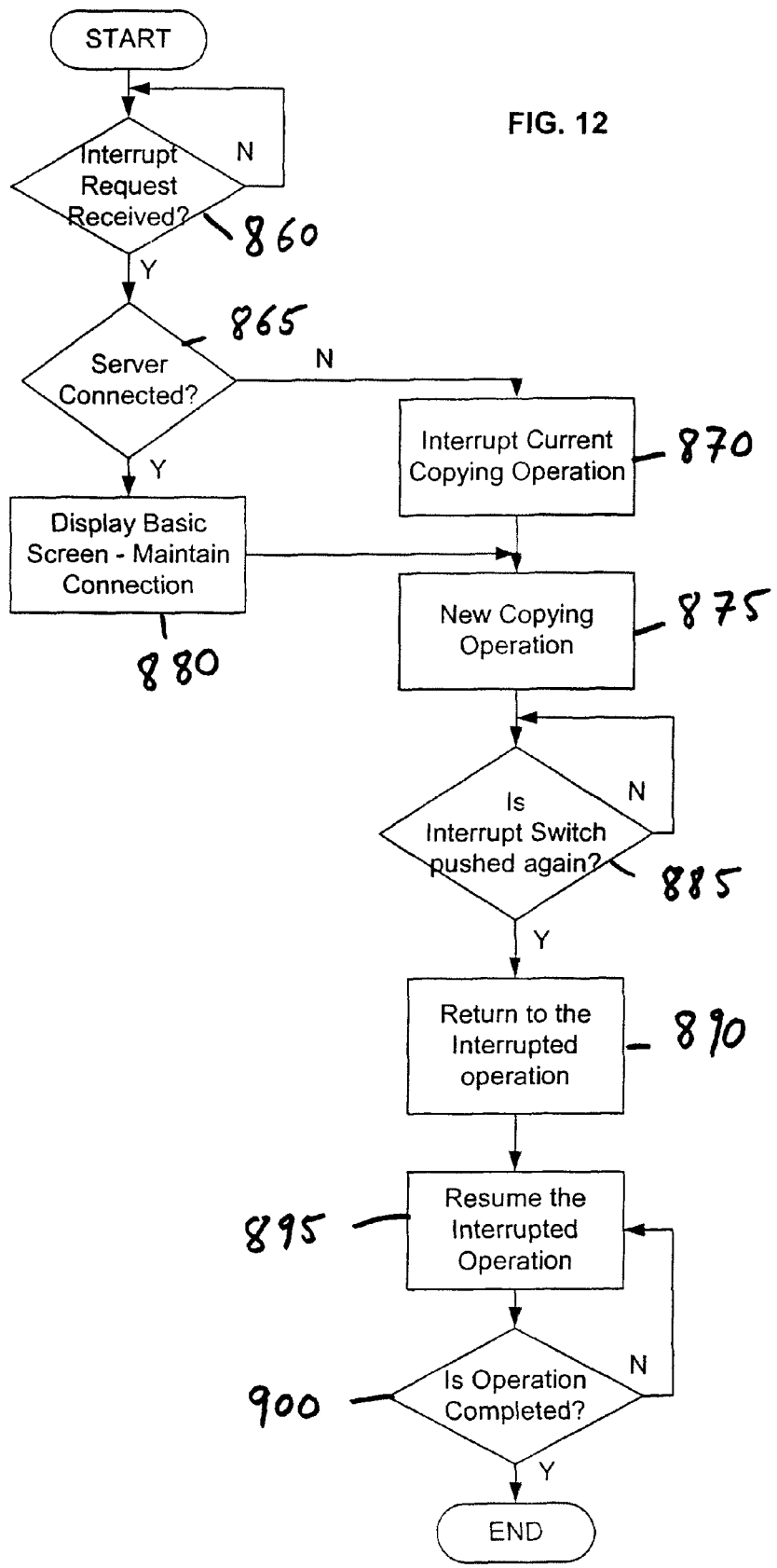
FIG. 12 shows a flowchart of a method of managing documents from an image forming apparatus according to another embodiment of the present invention.

In a preferred embodiment, the MFP 90 permits a copy operation to be performed by the MFP 90 while maintaining the document manager 60 connection. This embodiment is particularly useful when several users (operators) are using the MFP 90. For example, while one user may be retrieving a document from an ASP via document manager 60, another user can use the MFP 90 to copy documents. This embodiment is now described in connection with FIG. 12. Referring to FIG. 12, MFP 90 inquires at step 860 whether an interrupt request is received. If an interrupt request is not received, the MFP 90 loops back. Once an interrupt request is received, the MFP 90 inquires at step 865 whether the document manager 60 is connected. If the document manager 60 is not connected, the MFP 90 interrupts at step 870 the current copy operation. If the document manager 60 is connected, the MFP 90 displays at step 880 a basic screen while maintaining the connection with the document manager 60. At step 875, the MFP 90 performs a new copy operation. At step 885, the MFP 90 inquires whether the interrupt switch is pushed again. If not, the MFP 90 loops back. If the interrupt switch is pushed again, the MFP returns to the interrupted operation at step 890, and resumes the interrupted operation at step 895. If the interrupted operation is an ASP document operation, the MFP 90 displays the ASP document mode menu that was displayed prior to the interrupt request. At step 900, the MFP 90 inquires whether the (interrupted) operation is completed. If the operation is not completed, the MFP 90 loops back to step 895 until the operation is completed. Once the operation is completed, the MFP 90 ends its routine.

Figure 1:
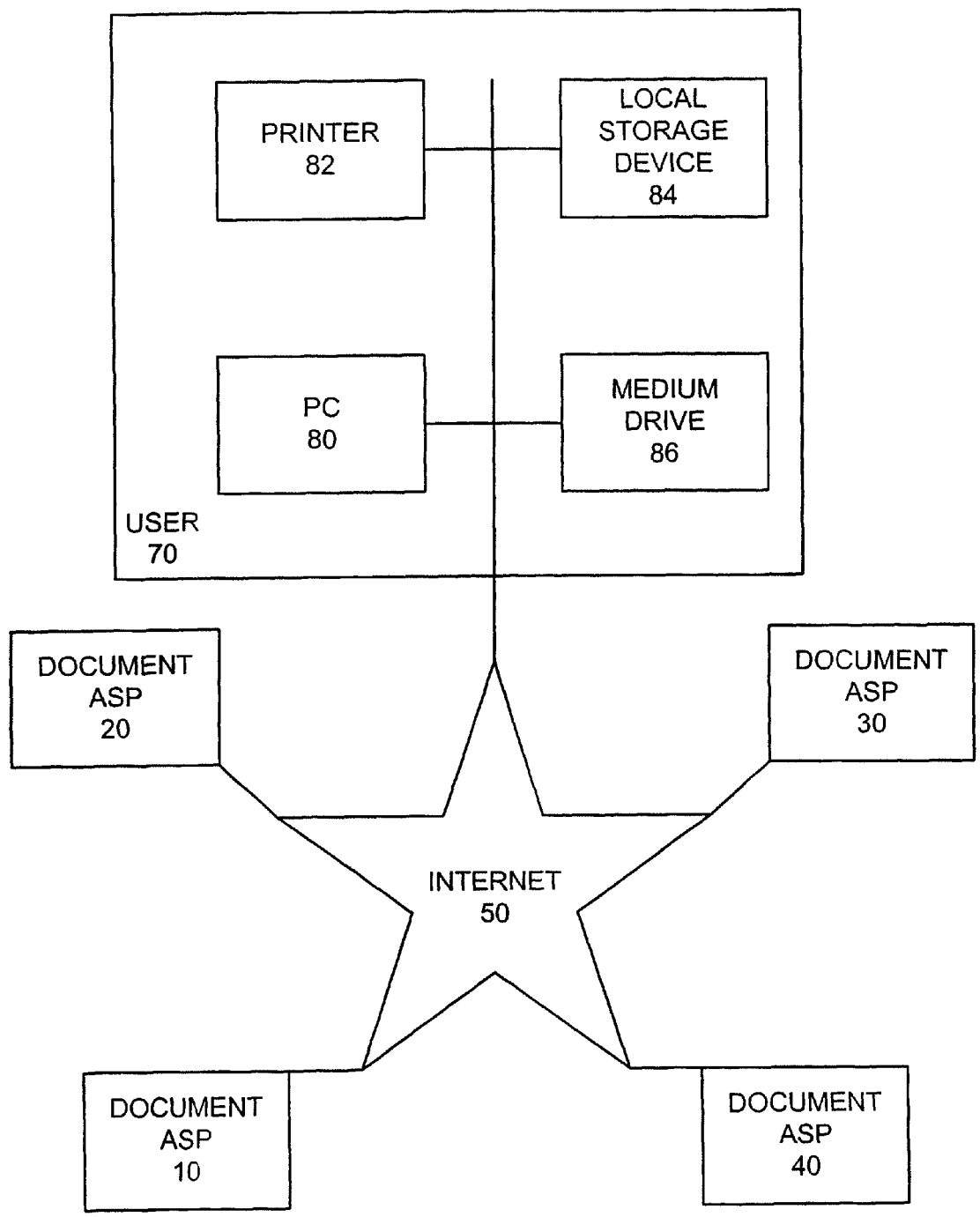
FIG. 1 is a block diagram showing a conventional ASP/user network.
Figure 13:
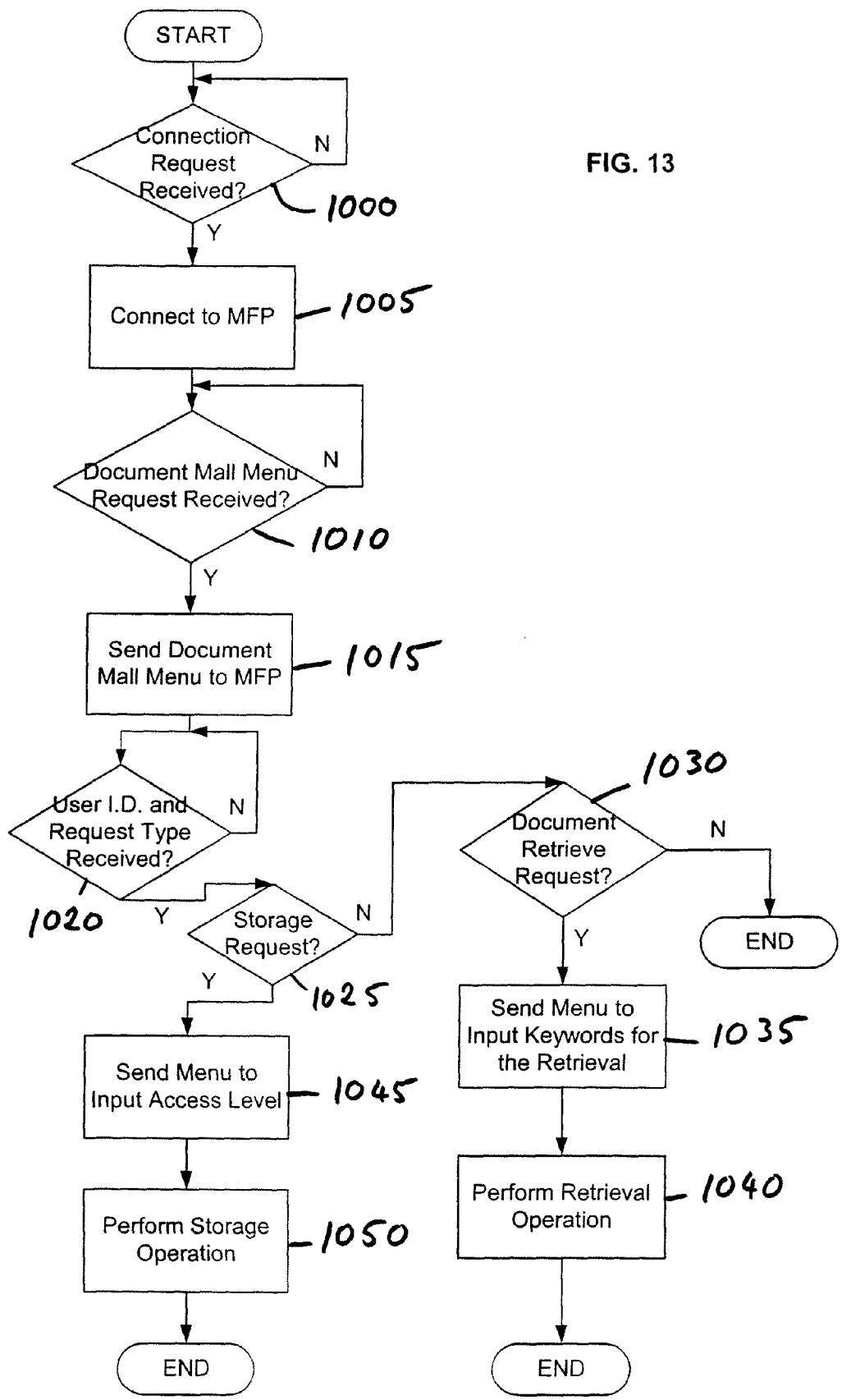
FIG. 13 shows a flowchart of a method of managing documents from a document manager according to one embodiment of the present invention.

As mentioned above, in one embodiment of the present invention, the menus for the ASP document mode may be stored at the document manager 60, so that the MFP 90 requests and receives the menus from the document manager 60 for displaying on the display screen 142. The steps performed by the document manager 60 in this embodiment are now described in connection with FIG. 13. Referring to FIG. 13, the document manager 60 inquires at step 1000 whether a request for a connection is received. Once the connection request is received, at step 1005 the document manager 60 connects to the MFP 90. At step 1010, the document manager 60 inquires whether a Document Mall menu request is received. If no such request is received, the document manager loops. Once a Document Mall menu request is received, the document manager 60 sends at step 1015 a Document Mall menu to the MFP 90. For example, document manager 60 can send a menu such as the one shown in FIG. 5A. The document manager 60 then inquires at step 1020 whether a user I.D. and a request type is received. The request type is for example a document storage request or a document retrieval request. Document manager 60 loops until these entries are received. The document manager 60 then inquires at step 1025 whether the request is a document storage request. If the request is not a storage request, the document manager 60 inquires at step 1030 whether the request is a document retrieve request. If the request is not a retrieve request, the document manager 60 ends its routine. If the request is a retrieve request, the document manager 60 sends at step 1035 a menu prompting the operator of the MFP 90 to input keywords for the retrieval operation. For example, document manager 60 can send a menu such as the one shown in FIG. 5C. The document manager then performs the retrieval operation at step 1040. The retrieval operation of step 1040 is described in detail in commonly owned co-pending Ser. No. 09/684,965, the entire content of which is hereby incorporated by reference. In particular, FIGS. 5A1, 5A2, C and D of Ser. No. 09/684,965 describe the retrieval operation performed by document manager 60 at step 1040. Once the retrieval operation is completed, the document manager 60 may end its routine.

Returning to step 1025, if the request is a storage request, the document manager 60 sends at step 1045 a menu prompting the operator of the MFP 90 to input the access level for the storage operation. For example, document manager 60 can send a menu such as the one shown in FIG. 5B. The document manager then performs the storage operation at step 1050. The storage operation of step 1050 is described in detail in commonly owned co-pending Ser. No. 09/684,965, and more particularly with FIGS. 5B and C of Ser. No. 09/684,965. Once the storage operation is completed, the document manager 60 may end its routine.

Figure 14:
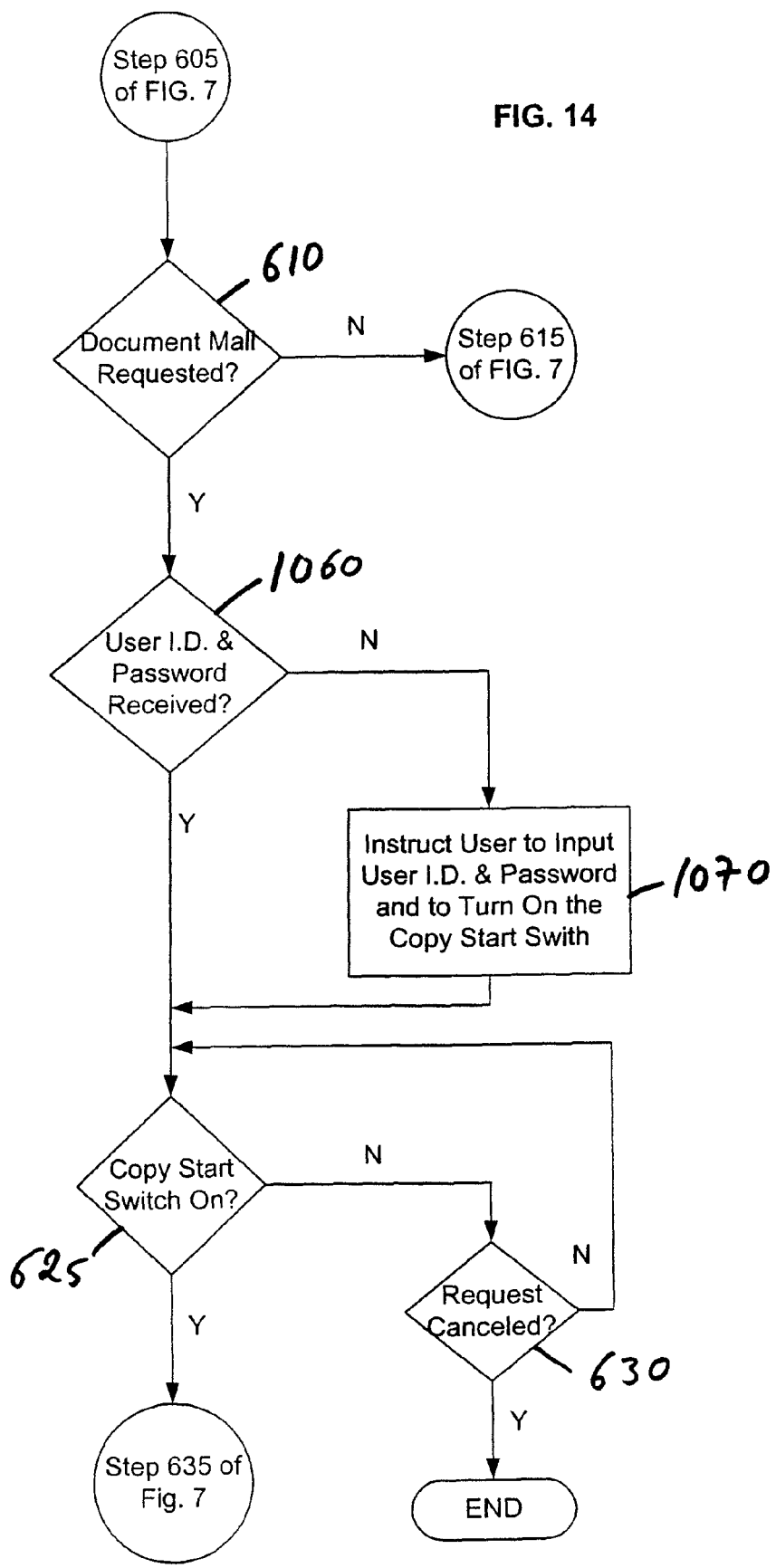
FIG. 14 shows a flowchart of a method of managing documents from an image forming apparatus according to another embodiment of the present invention.

As mentioned above, in a preferred embodiment of the present invention, customized menus for the ASP document mode can be displayed on the display screen 142. The steps performed by the MFP 90 for this embodiment are now described in connection with FIG. 14. The steps associated with this embodiment can be added to those of the embodiment shown in FIG. 7. Referring to FIG. 14, the MFP 90 inquires at step 610 (same as in FIG. 7) whether the Document Mall is requested. If the Document Mall is not requested, the MFP 90 goes to step 615 of FIG. 7. If the Document Mall is requested, the MFP 90 inquires at step 1060 whether the user I.D. and password are received. If these entries are not received, the MFP 90 instructs the user at step 1070 to input the user I.D. and password, and to turn on the copy start switch. Once the user I.D. and password are received, the MFP 90 inquires at step 625 whether the copy start switch is turned on. If not, the MFP 90 inquires at step 630 wether the request is canceled. If the request is canceled, the MFP 90 ends its routine. Otherwise, the MFP 90 loops back to step 625. Once the copy start switch is turned on, the MFP 90 goes to step 635 of FIG. 7.

Figure 15:
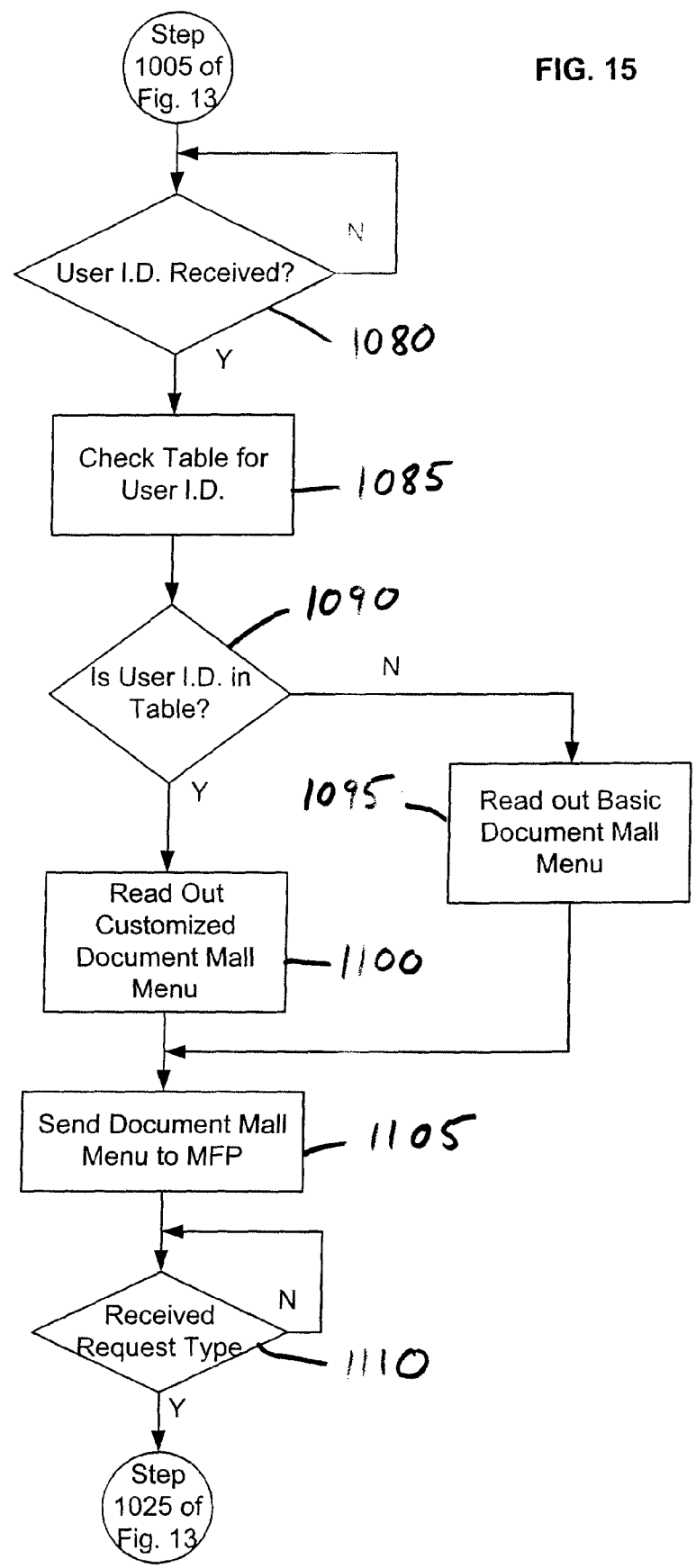
FIG. 15 shows a flowchart of a method of managing documents from a document manager according to another embodiment of the present invention.

In the above embodiment, wherein customized menus are displayed at the display screen 142, the customized menus can be stored at the document manager 60. In that case, the document manager 60 follows a different method than the one shown in FIG. 13. This modified embodiment for the document manager 60 is described next in connection with FIG. 15. Referring to FIG. 15, the document manager 60 inquires at step 1080 whether the user I.D. is received. If not, the document manager 60 loops until the user I.D. is received. Once the user I.D. is received, the document manager 60 checks at step 1085 the received user I.D. against a look-up table. The look-up table can be stored at the document manager 60. The document manager 60 inquires at step 1090 whether the received user I.D. corresponds to a user I.D. in the look-up table. If the received user I.D. does not correspond to any user I.D. in the look-up table, the document manager 60 at step 1095 reads out a basic Document Mall menu. This basic (or default) Document Mall menu can be stored at the document manager 60. If the received user I.D. corresponds to a user I.D. in the look-up table, the document manager at step 1100 reads out a customized Document Mall menu corresponding to the received user I.D., for example from a database located at the document manager 60. At step 1105, the document manager 60 sends the Document Mall menu (either the basic or the customized) to the MFP 90. The document manager 60 then goes to step 1025 of FIG. 13 and completes its operations.

The above methods (FIGS. 7-15) represent exemplary embodiments of the present invention, and the present invention is not limited to the specific steps, nor the order of the steps, presented above. A person of ordinary skill in the art would recognize that the present invention can be implemented using a variety of similar steps in a variety of orders.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

This invention may also be conveniently implemented using a conventional general purpose digital computer programmed according to the teachings of the present specification, as will be apparent to those skilled in the computer art. Appropriate software coding can readily be prepared by skilled programmers based on the teachings of the present disclosure as will be apparent to those skilled in the software art. In particular, the computer program product for providing interactive menus and managing ASP documents according to the present invention can be written in a number of computer languages including but not limited to C, $C^{++}$, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims the present invention may be practiced otherwise than as specifically described herein.

What is claimed:

1. An image processing apparatus, comprising:
   a control panel including a display screen and a start key;
   the display screen configured to display a basic screen indicating one or a plurality of copy options and messages, and a document mall selection button;
   a processor configured to establish a connection between the image processing apparatus and a document manager via a network when the document mall selection button is selected; and
   a processor configured to start at least one of a copying operation and a document operation when the start key is selected, wherein
   the display is configured to display a keyword field, a date field and a document type field when the document operation is a document retrieval operation, and
   the control panel is configured to receive an input for at least one of the keyword field, date field and document type field.

2. The apparatus of claim 1, wherein
   the display screen is configured to display a message received from the document manager.

3. The apparatus of claim 1, wherein
   the display screen is configured to display an interactive area; and
   the control panel is configured to receive a user input corresponding to information displayed in the interactive area.

4. The apparatus of claim 1, wherein
   the display screen is configured to display at least a first field for entering at least one of a username and password.

5. The apparatus of claim 1, wherein
   the display is configured to display a document title field, a date field and an access level field when the document operation is a document storage operation; and
   the control panel is configured to receive an input for at least one of the document title field, date field and access level field.

6. The apparatus of claim 4, further comprising:
   a communications interface configured to transmit, from the image processing apparatus to the document manager via a network, a document, a document title, a date and an access level based on the received inputs.

7. The apparatus of claim 5, further comprising:
   a communications interface configured to transmit, from the image processing apparatus to the document manager via a network, a request for a document, the request including at least one of a keyword, date and document type corresponding to the received inputs.

8. A method of displaying information at an image processing device, comprising:
   displaying, at a display of the image processing apparatus, a basic screen indicating one or a plurality of copy options and messages, and a document mall selection button;
   establishing a connection between the image processing apparatus and a document manager via a network when the document mall selection button is selected;
   starting at least one of a copying operation and a document operation when a start key on a control panel of the image processing device is selected;

displaying, at the display screen of the image processing device, a keyword field, a date field and a document type field when the document operation is a document retrieval operation; and receiving, at the control panel of the image processing device, an input for at least one of the keyword field, date field and document type field.

9. The method of claim 8, further comprising:

displaying a message received from the document manager.

10. The method of claim 8, further comprising:

displaying an interactive area on the display of the image processing device; and receiving a user input corresponding to information displayed in the interactive area at the control panel of the image processing device.

11. The method of claim 8, further comprising:

displaying, on the display screen of the image processing device, at least a first field for entering at least one of a username and password.

12. The method of claim 8, further comprising:

displaying, on the display screen of the image processing device, a document title field, a date field and an access level field when the document operation is a document storage operation; and receiving, at the control panel of the image processing device, an input for at least one of the document title field, date field and access level field.

13. The method of claim 11, further comprising:

transmitting, from the image processing apparatus to the document manager via a network, a document, a document title, a date and an access level based on the received inputs.

14. The method of claim 12, further comprising:

transmitting, from the image processing apparatus to the document manager via a network, a request for a document, the request including at least one of a keyword, date and document type corresponding to the received inputs.

15. An image processing apparatus, comprising:

means for displaying, at a display of the image processing apparatus, a basic screen indicating one or a plurality of copy options and messages, and a document mall selection button;

means for establishing a connection between the image processing apparatus and a document manager via a network when the document mall selection button is selected; and means for starting at least one of a copying operation and a document operation when a start key on a control panel of the image processing device is selected, wherein the means for displaying displays a keyword field, a date field and a document type field when the document operation is a document retrieval operation, and the control panel is configured to receive an input for at least one of the keyword field, date field and document type field.

16. A non-trasitory computer readable medium including computer program instructions which cause a image processing device to execute a method of displaying information, comprising:

displaying, at a display of the image processing apparatus, a basic screen indicating one or a plurality of copy options and messages, and a document mall selection button;

establishing a connection between the image processing apparatus and a document manager via a network when the document mall selection button is selected;

starting at least one of a copying operation and a document operation when a start key on a control panel of the image processing device is selected;

displaying, at the display screen of the image processing device, a keyword field, a date field and a document type field when the document operation is a document retrieval operation; and receiving, at the control panel of the image processing device, an input for at least one of the keyword field, date field and document type field.

* * * * *